United States Patent
Wang et al.

(10) Patent No.: US 8,503,586 B2
(45) Date of Patent: Aug. 6, 2013

(54) RECEIVING APPARATUS AND METHOD WITH CLOCK DRIFT ESTIMATION AND COMPENSATION

(75) Inventors: Zhaocheng Wang, Beijing (CN); Qi Wang, Esslingen (DE); Richard Stirling-Gallacher, Stuttgart (DE); Ralf Boehnke, Esslingen (DE)

(73) Assignee: Sony Corporation, Tokyo (JP)

(*) Notice: Subject to any disclaimer, the term of this patent is extended or adjusted under 35 U.S.C. 154(b) by 751 days.

(21) Appl. No.: 12/730,357

(22) Filed: Mar. 24, 2010

(65) Prior Publication Data
US 2010/0266082 A1 Oct. 21, 2010

(30) Foreign Application Priority Data
Apr. 16, 2009 (EP) .................................... 09158020

(51) Int. Cl.
*H04L 7/00* (2006.01)
(52) U.S. Cl.
USPC .......................................... 375/343; 375/354
(58) Field of Classification Search
USPC .................................................. 375/343, 354
See application file for complete search history.

(56) References Cited

U.S. PATENT DOCUMENTS

| | | | | |
|---|---|---|---|---|
| 6,487,252 | B1 * | 11/2002 | Kleider et al. ................ | 375/260 |
| 7,170,945 | B2 * | 1/2007 | Blat .............................. | 375/260 |
| 2008/0273646 | A1 * | 11/2008 | Ammar et al. ................ | 375/371 |
| 2009/0265104 | A1 * | 10/2009 | Shroff .......................... | 701/216 |

FOREIGN PATENT DOCUMENTS

| | | |
|---|---|---|
| CN | 1346185 A | 4/2002 |
| JP | 2006-203291 A | 8/2006 |
| JP | 2006-211441 A | 8/2006 |

OTHER PUBLICATIONS

David Falconer et al., "Frequency Domain Equalization for Single-Carrier Broadband Wireless Systems", Wideband Wireless Access Technologies to Broadband Internet, IEEE Communications Magazine, Apr. 2002, pp. 58-66.
Hiroshi Harada et al., "Merged proposal: New PHY Layer and Enhancement of MAC for mmWave System Proposal", IEEE P802.15 Working Group for Wireless Personal Area Networks (WPANs), IEEE 802.15-07-0934-01-003c, Nov. 2007, 89 pages.
Office Action issued Dec. 20, 2012, in Japanese Patent Application No. 2010-10163379 (with English translation).
International Search Report issued Dec. 12, 2012 in Japanese Patent Application No. 201010163379, filed Apr. 16, 2010 (English only).

* cited by examiner

*Primary Examiner* — Don N Vo
(74) *Attorney, Agent, or Firm* — Oblon, Spivak, McClelland, Maier & Neustadt, L.L.P.

(57) ABSTRACT

The present invention relates to a receiving apparatus for receiving signals in a communication system in which the signals are transmitted on the basis of frames. Each frame includes a data part having data blocks, wherein the data blocks are respectively separated by a guard sequence. The receiving apparatus performs a correlation on the guard sequences of a received signal and performs a clock drift estimation in the frequency domain on the basis of the correlation results. The receiving apparatus also compensates the clock drift of the received signal on the basis of the clock drift estimation.

14 Claims, 3 Drawing Sheets

Fig. 3
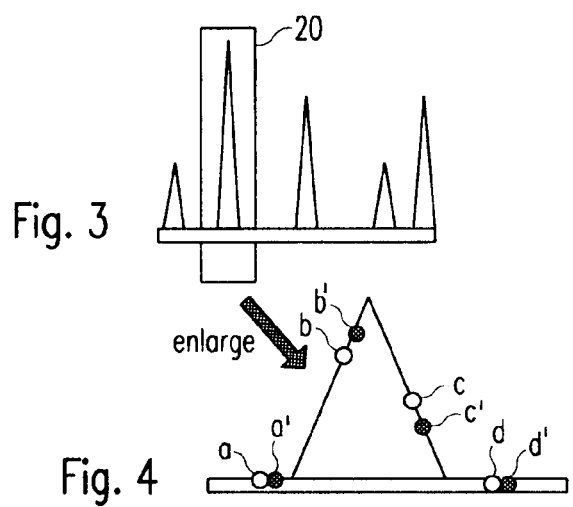
Fig. 4
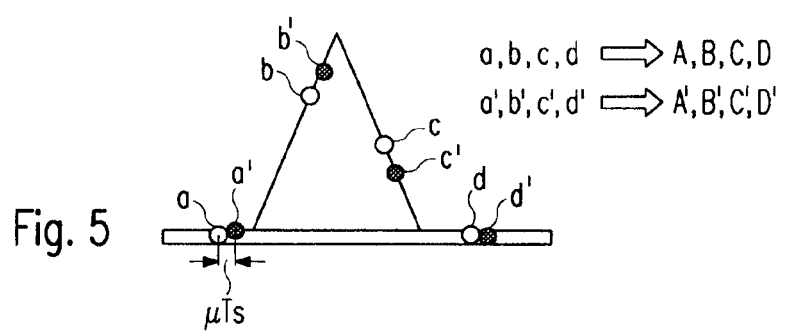
Fig. 5
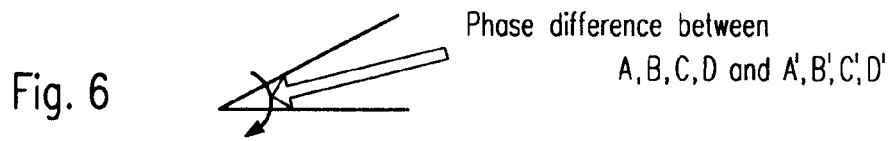
Fig. 6

RECEIVING APPARATUS AND METHOD WITH CLOCK DRIFT ESTIMATION AND COMPENSATION

FIELD OF THE INVENTION

The present invention relates to a receiving apparatus and a receiving method for receiving signals in a communication system, in which the clock drift is estimated and compensated. The communication system may be a wireless or non-wireless (i.e. cable base) system. Throughout this description, however we will describe an application of the patent in a wireless system. The invention can equally be used in a non-wireless system.

The present invention particularly relates to a wireless communication system in which the signals are transmitted on the basis of time domain frames. Each frame hereby comprises data blocks as well as additional synchronization sequences and/or channel estimation sequences which precede the data blocks in each frame and which are necessary and used on the receiving side for automatic gain control, frame timing, frequency synchronization, channel estimation and/or other necessary processing steps. The time difference between the transmitter—and the receiver—is normally adjusted in the receiver by performing time synchronization, e.g. by using the correlation result from a channel estimation sequence or the like.

BACKGROUND OF THE INVENTION

However, since in most applications the transmitter clock and the receiver clock are not running at exactly the same frequency, an additional clock drift exists which reduces the performance in the receiver. This is particularly true for wireless communication systems in which the time frame length is comparatively long, for example in cases in which one frame includes more than one hundred FFT (Fast Fourier Transformation) blocks, each FFT block including several hundred symbols. For example high data rate single carrier wireless systems using SC-FDE (single carrier frequency domain equalization), the frame length might include for example 256 FFT blocks, each FFT block including 512 symbols. When the clock drift between the transmitter clock and the receiver clock is 10 ppm and the length of a data part in a frame is 32000 symbols, the sampling drift within the frame is about 0.32 symbols, which shows that a clock drift compensation or symbol tracking is necessary.

The symbol tracking or clock drift compensation could be realized using a correlation of a time domain sequence, but this would result in additional overhead. In addition, a high oversampling rate, i.e. an ADC sampling rate which is high compared to the symbol rate, would be necessary, resulting in a more complex structure.

BRIEF SUMMARY OF THE INVENTION

The object of the present invention is therefore to suggest a receiving apparatus and a receiving method for receiving signals in a wireless communication system, in which the signals are transmitted on the basis of frames, each frame comprising a data part comprising data blocks, which—enable a simple but efficient clock drift estimation and compensation.

The above objective is achieved by a receiving apparatus according to independent claim 1 and a receiving method according to independent claim 8.

The present invention suggests a receiving apparatus for receiving signals in a wireless communication system, e.g. a wireless or a wired communication system, in which the signals are transmitted on the basis of frames, each frame comprising a data part comprising data blocks, wherein the data blocks are respectively separated by a guard sequence, said receiving apparatus comprising correlation means adapted to perform a correlation on the guard sequences of a received signal, clock drift estimation means adapted to perform a clock drift estimation in the frequency domain on the basis of the correlation result from the correlation means, and clock drift compensation means adapted to compensate the clock drift of the received signals on the basis of the clock drift estimation.

The present invention is further directed to a receiving method for receiving signals in communication system, in which the signals are transmitted on the basis of frames, each frame comprising a data part comprising data blocks, wherein the data blocks are respectively separated by a guard sequence, said receiving method comprising the steps of performing a correlation on the guard sequences of a received signal, performing a clock drift estimation in the frequency domain on the basis of the correlation result from the correlation step, and compensating the clock drift of the received signals on the basis of the clock drift estimation.

The present invention therefore suggests to use the guard sequences, i.e. the intervals arranged between the data blocks in the data part of each frame to perform a clock drift estimation in the frequency domain on the receiving side. Performing the clock drift estimation in the frequency domain has the additional advantage of a higher resolution and a simpler and more effective implementation as compared to an implementation of a clock drift estimation in the time domain. The term guard sequence is hereby intended to characterize any kind of repetitive sequence, cyclic prefix, common word etc. which is arranged between the data blocks in the data part of each frame. In some documents, the term data block is used to characterize a combination of a guard interval and a data block (or two guard intervals in the data block). However, the present invention is intended to cover all these different ways of describing temporal frames having data part (or more data parts), each data part comprising data blocks which are separated by respective guard intervals. The guard intervals could hereby comprise respective identical guard sequences or might comprise varying guard sequences. Normally, the guard sequences would have the respective identical length. The data blocks normally would also have the respective identical length. As mentioned, any kind of suitable sequence having good correlation properties could be used for the guard sequences, such as but not limited to Golay sequences, pseudo noise sequences or the like. In a normal implementation, the length of the respective guard sequences or guard intervals is set so that the receiver is able to cope with time dispersive channels, i.e. the channel impulse response should be shorter than the guard interval.

The correlation means is adapted to perform a first correlation on a first guard sequence of a frame of a received signal and a second correlation on a second guard sequence of the same frame, wherein the clock drift estimation means is adapted to perform the clock drift estimation on the basis of the correlation results of the first and the second correlation. By comparing the correlation results from a first guard sequence and a second guard sequence in a frame, the receiving apparatus is able to determine the clock drift. Hereby, the first and the second guard sequence can be adjacent to each other, i.e. can be separated only by a single data block, or could be separated by several data blocks and the respective guard sequences in between these data blocks. Advantageously, the clock drift estimation means is adapted to perform the clock drift estimation on the basis of a phase difference between the first and the second correlation result. The correlation is normally performed in the time domain. However, calculating the clock drift in the time domain is comparatively complex. The present invention therefore suggests to perform the clock drift estimation in the frequency domain, i.e. after a time to frequency transformation of the correlation result or at least a part of the respective correlation results from the clock drift estimation means, so that a clock drift can be estimated on the basis of a phase difference between the first and the second correlation result in a relatively simple but very efficient way.

Advantageously, the clock drift estimation means is adapted to perform the clock drift estimation on the basis of only a part of the correlation result(s) from the correlation means. Hereby, advantageously, the clock drift estimation means is adapted to perform the clock drift estimation on the basis of a highest peak of a correlation result(s).

Further advantageously, the time distance between the first and the second correlation performed by the clock drift estimation means is variable. In other words, the selection which ones of the guard sequences in a received frame will be used for the correlation and the subsequent clock drift estimation is flexible, i.e. the time distance between the first and second guard sequences in a data part of a frame which are used for a clock drift estimation is variable. Hereby, the time distance between the first and the second correlation performed by the clock drift estimation means advantageously may for example depend on the clock difference, i.e. on the difference between the transmitter and the receiver clock. For example, the larger the clock difference is, the smaller the time distance between first and second correction needs to be. On the other hand, if the clock difference is smaller it is preferable that, the time distance between the first and the second correlation is longer.

Further advantageously, said correlation means (14) is adapted to perform at least one further correlation on at least one further guard sequence of said frame, and wherein said clock drift estimation means (15) is adapted to perform said clock drift estimation on the basis of averaged correlation results of the first, the second and the at least one further correlation. Hereby, the negative effects of noise could be reduced. For example, the correlation means could be adapted to perform said correlation on respective pairs of the guard sequences, e.g. the first and the second guard sequence and then the second and the third guard sequence, and then the clock drift estimation means could be adapted to perform the clock drift estimation on the correlation result of each pair, and then to perform an averaging between the various estimation results in order to obtain the final clock drift estimation result. The averaging could be performed in any suitable manner.

It is to be understood that the receiving apparatus and the receiving method of the present invention can be implemented in any kind of suitable device, unit, apparatus and so forth, if necessary in combination with other features and functionalities necessary for the respective application. For example, the receiving apparatus could be realised as a portable, hand held, stand-alone, permanent etc. device adapted to communicate in any kind of wireless communication system. A wireless communication system can be any kind of wireless communication system in which any kind of data are transmitted and received over a wireless interface. For example, the wireless communication system could be any kind of multicarrier system, or could be any kind of single carrier system. For example, the receiving apparatus and method could comprise a frequency domain equalization, i.e. an equalization which takes place in the frequency domain and could be implemented in a single carrier communication system. However, the receiving apparatus and the receiving method of the present invention are not limited to these examples. Further, the receiving apparatus could be a part of a communication apparatus adapted to receive and transmit signals in the wireless communication system. The term "means" as used throughout the present application is intended to characterize any kind of implementation in a functional unit adapted to perform the respective functions, such as but not limited to any kind of unit, element, device, eventually in combination with other functionalities, and could be implemented in any kind of suitable software, hardware or any suitable mixture thereof. Further, the present invention is related to any kind of wireless communication system in which the signals are transmitted and received in temporal frames, each frame comprising one or more data parts with data blocks, which are separated by guard intervals or guard sequences. Each frame could or could not comprise additional parts, such as synchronization sequences or synchronization patterns, channel estimation sequences, training sequences etc.

BRIEF DESCRIPTION OF THE SEVERAL VIEWS OF THE DRAWINGS

The present invention is explained in more detail in the following description of a preferred embodiment in relation to the enclosed drawings, in which FIG. 3 shows a schematic example of a correlation result, FIG. 4 shows a schematic example of a part of the correlation result of FIG. 3, FIG. 5 shows the schematic example of FIG. 4 with additional information explaining the clock drift estimation, FIG. 6 shows a schematic example of a phase difference calculation used in the clock drift estimation according to the present invention.

DETAILED DESCRIPTION OF THE INVENTION

The following description of a preferred embodiment of the present invention relates to a receiving apparatus and a receiving method in which a single carrier frequency domain equalization is implemented. However, the present invention is not restricted to single carrier systems, but could also be used in multicarrier systems. Further, implementations of the present invention could be possible in systems with a time domain equalization.

Figure 1:
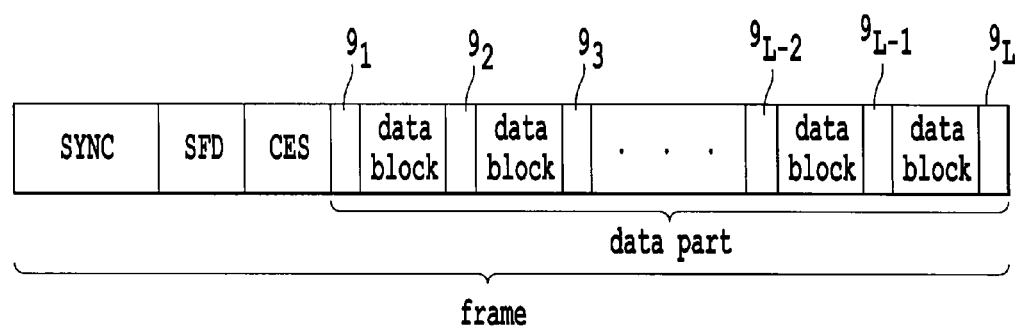
FIG. 1 shows a schematic example of a frame structure used in the present invention.

FIG. 1 shows a schematic example of a frame structure for the signals transmitted and received in a wireless communication system as used in the receiving apparatus and the method of the present invention. The shown example of the frame structure shows a frame comprising a synchronization part (SYNC), which is followed by a start frame delimiter (SFD), which is followed by a channel estimation sequence (CES), which is then followed by a data part, the data part comprising one or more data blocks. The data blocks are respectively separated by guard intervals or guard sequences, each of the guard sequences having the same length and content, for example any kind of suitable sequence with good correlation properties, such as a pseudo noise sequence, a Golay sequence or any other suitable sequence. The respective content of the data blocks is normally varying.

It should be understood that a frame of the present invention could comprise several data parts, each data part comprising several data blocks being respectively separated by guard sequences. Also, a frame could only consist of one data part or several data parts respectively comprising data blocks being separated by guard sequences. Alternatively, each frame could comprise additional information, sequences or the like necessary for the processing in the receiver, such as in the example shown in FIG. 1. In the example of FIG. 1, the SYNC part is used in the receiving apparatus 1 as shown and explained in relation to FIG. 2 for automatic gain control and coarse frame timing. The SFD indicates the end of the synchronization sequence and the beginning of the CES. The CES may comprise any kind of suitable dedicated channel estimation sequence used for a channel estimation in the receiving apparatus 1. However, as mentioned, the present invention is not limited to a frame structure as shown in FIG. 1. For example, the SYNC, the SFD and the CES parts could be arranged in a specially dedicated frame and the data blocks could be arranged in a frame which exclusively consists of data blocks and guard sequences as described. However, other arrangements are possible.

Figure 2:
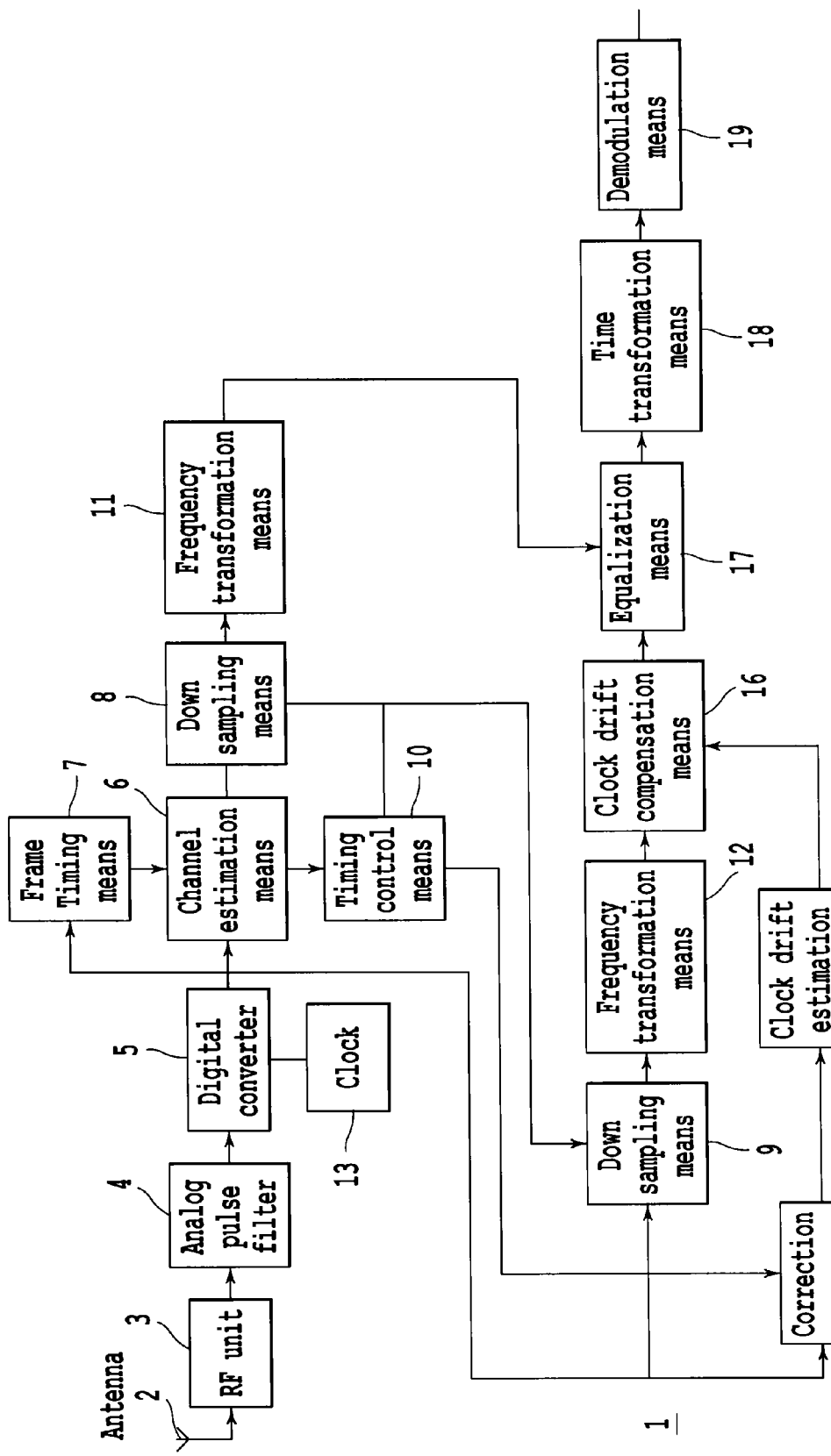
FIG. 2 shows a schematic block diagram of a receiving apparatus of the present invention.

FIG. 2 shows a schematic block diagram of an embodiment of a receiving apparatus 1 for receiving signals in a wireless communication system according to the present invention. It has to be noted that FIG. 2 and the following explanation only refers to elements and functionalities of the receiving apparatus 1 which are necessary for the understanding of the present invention. In a practical implementation, the receiving apparatus will contain additional functionalities and elements for a normal operation.

The receiving apparatus 1 comprises an antenna 2 adapted to receive wireless signals in the wireless communication system. The received signals are forwarded to a RF (radio frequency) unit 3 or the like adapted to down-convert the received signals from the radio frequency to the baseband. It should be noted that the present invention is not limited to radio frequencies, any kind of frequency band could be used. The down-converted signals from the RF unit 3 are forwarded to an analog pulse filter 4 which normally has the same pulse shape as the transmitted pulse. The pulse shaped signals are then forwarded to an analog to digital converter 5 which is adapted to convert the received signals and to digital samples, for example complex samples, with a suitable sampling rate, which could for example be identical to the symbol rate of the received signals, could be two times the symbol rate of the received signals, four times the symbol rate of the received signals and so forth. The sampling rate of the analog to digital converter 5 is determined by a clock 13 which supplies the clock signals with the sampling rate of "2".

The digital samples output from the analog to digital converter 5 are split into several branches, whereby FIG. 2 only shows four different branches for the sake of clarity. The first branch leads to frame timing means 7, to which the digital samples of the SYNC part of each frame are supplied. The frame timing means 7 is adapted to perform a time synchronization, for example by performing an auto-correlation or a cross-correlation or any other suitable processing on the SYNC part in order to obtain a synchronizing peak which indicates the start position of the channel estimation sequence in each frame. Information about the start position of the channel estimation sequence is supplied from the frame timing means 7 to a channel estimation means 6, which is part of the second branch.

Via the second branch, the channel estimation means 6 receives the digital samples of the channel estimation sequence from the analog to digital converter 5. Hereby, the channel estimation means 6 performs auto-correlation, cross-correlation or any other suitable processing in order to obtain a time domain based channel estimation, which is for example a complex estimation of the channel (I and Q) delay profile.

The third branch of the receiving apparatus 1 is the branch in which the content data of the data blocks of a received signal are processed (other branches in an actual implementation which are not shown in FIG. 2 could include processing blocks to perform frequency offset compensation, and so forth). The digital samples of the content data from the analog to digital converter 5 are supplied to a down sampling means 9 which is adapted to down sample the digital samples to the symbol rate of the received signals. For example, if the analog to digital converter 5 performs a two times over sampling, i.e. samples the received signals with a sampling rate which is two times the symbol rate of the received signals, then the down sampling means 9 performs a down sampling by a factor of two. The same functionality is implemented in the down sampling means 8 which down samples the digital samples output from the channel estimation means 6 before they are forwarded to a time to frequency transformation means 11. Similarly, the down sampled digital samples output from the down sampling means 9 are forwarded to a time to frequency transformation means 12. Hereby, the start position of the time to frequency compensation performed in the time to frequency transformation means 11 and 12 is controlled via the down sampling means 8 and 9, respectively, which are respectively controlled by a peak detector and timing control means 10 which is adapted to detect the start position of the channel delay profile determined in the channel estimation means 6. Thus, the start position of the channel delay profile which is time to frequency transformed in the time to frequency transformation means 11 is controlled by the peak detector and timing control means 10 and the start position of the data which are time to frequency transformed in the time to frequency transformation means 12 is also controlled by the peak detector and timing control means 10. The frequency domain channel delay profile output from the time to frequency transformation means 11 is forwarded to an equalizing means 17 which is adapted to perform an equalization of the content data in the frequency domain output from the time to frequency transformation means 12.

The time to frequency transformation means 11 and 12 are for example Fast Fourier Transformation (FFT) means or any other suitable means. The equalization means 17 is adapted to perform any kind of suitable equalization, for example a Minimum Mean Square Equalization (MMSE) or any other suitable processing. The equalized data output from the equalizing means 17 are forwarded to a frequency to time transformation means 18, which for example performs an Inverse Fast Fourier Transformation (IFFT) or any other suitable processing. Thereafter, the time domain equalized content data are further processed, for example by a demodulation means 19 and any other suitable processing necessary for the respective application.

Before the equalization means 17 and after the time to frequency transformation means 12, a clock drift compensation means 16 is located in the third branch which is adapted to perform a clock drift compensation on the frequency domain content data before the equalization. The clock drift compensation means hereby compensates the drift between the clock used in the transmitter to transmit the signals which are received in the receiving apparatus 1 according to the present invention and the clock (for example the clock 13) used in the receiver to generate digital (complex) samples from the received analog signals. The clock drift is hereby the frequency difference or sample rate difference between the transmitter clock and the receiver clock. The clock drift compensation means 16 is adapted to compensate the clock drift in the frequency domain data samples on the basis of a clock drift estimation obtained from a clock drift estimation means 15. The clock drift estimation means 15 is part of a fourth branch of the receiving apparatus as shown in FIG. 2. In the fourth branch, a correlation means 14 is present which is adapted to perform a correlation on the guard sequences comprised in the data part in a frame of a received signal. The digitised samples of the guard sequences output from the analog to digital conversion means 5 are supplied to the correlation means 14 which, under the timing control of the peak detector and timing control means 10 which indicates the start of a respective guard sequence, is adapted to perform a correlation, such as an auto-correlation or a cross-correlation, on the guard sequence. The correlation result from the correlation means 14, i.e. a channel delay profile comprising one or more correlation peaks as for example shown in FIG. 3, is then forwarded to the clock drift estimation means 15. Before the actual clock drift estimation, the channel delay profile samples from the correlation means 14 are transformed from the time domain into the frequency domain by a corresponding time to frequency transformation means, which is either part of the clock drift estimation means 15 or a separate unit located between the correlation means 14 and the clock drift estimation means 15. In other words, the clock drift estimation means 15 operates in the frequency domain.

As mentioned, the information about the beginning of each guard sequence is obtained from the peak detector and timing control means 10, which detects the strongest communication path in a multi path environment. The correlation means 14 then correlates a received first guard sequence of a data part of a received frame by auto-correlation or by cross-correlation, i.e. by comparing the received guard sequence with a stored version of the guard sequence. Hereby, the correlation means 14 obtains a channel delay profile as for example shown in FIG. 3, in which several peaks are present. The channel delay profile, or to be more detailed the digital complex samples representing the channel delay profile are then transformed from the time domain into the frequency domain and further processed in the clock drift estimation means 15. Hereby, the clock drift estimation means 15 only uses a small region or part of the information around the highest correlation peak in the channel delay profile. Such a region is shown as region 20 in FIG. 3. FIG. 4 shows the region 20 with the highest correlation peak in an enlarged representation. Hereby, the digital complex samples within the region 20 around the highest correlation peak in the channel delay profile obtained by the correlation means 14 for the first guard sequence are represented by the four points a, b, c and d. The two points b and c represent the correlation peak. A small size of the region 20 means that e.g. only 4, 6 or 8 samples are contained in said region 20, which is advantageous since the necessary circuitry implementation such as for the time to frequency transformation is less complex. In case that the region 20 is chosen larger, e.g. more than 10 samples, the resulting circuitry is more complex, but the noise reduction may be better.

FIG. 4 further shows four digital samples resulting from the correlation of a second guard sequence of the same data part in the received frame. The four digital samples resulting from the correlation of the second guard sequence are characterized by a', b', c', and d', whereby b' and c' represent the highest correlation peak. Without any clock drift, the samples a and a', b and b', c and c', d and d' would respectively be located at the exact same position in the channel delay profile. However, since a clock drift is present, there is a time shift between the respective samples a and a', b and b', c and c', d and d' as visible in FIG. 4. By calculating or estimating this time shift, the clock drift can be estimated, as for example shown in the schematic example of FIG. 5, which corresponds to FIG. 4 except that the time shift (which is the clock drift) μTs between the samples a and a' is shown.

In order to allow a simpler but more accurate and efficient determination of a clock drift, the digital samples either of the entire channel delay profile or only the ones inside the region 20 around the highest correlation peak are transformed into the frequency domain, i.e. the time domain samples a, a', b, b', c, c', d, d' are transformed into respective frequency domain samples A, A', B, B', C, C', D, D', respectively. The clock drift estimation means 15 then calculates the average angle difference, i.e. the average phase difference between the frequency domain samples A, B, C, D from the first guard sequence and the frequency domain samples A', B', C', D' from the second guard sequence. This angle, i.e. the phase difference allows the calculation of the clock drift in the clock drift estimation means 15 with the following formula:

$$PH = \frac{2\pi}{M} \times \frac{\mu Ts}{Ts/OS}$$

wherein PH is the calculated phase difference, Ts is the symbol period, μTs is the clock drift between the transmitter clock and the receiver clock, OS is the oversampling rate and M is the size (number of samples) of the time to frequency transformation for the clock drift estimation. The above shown formula describes the phase difference PH between the respective pairs of samples in FIG. 5, wherein the due to the time to frequency transformation the phase difference PH in the above formula is true only for the sample pair b and b'. For the sample pair c and c' it would be 2 times PH and for the sample pair c and c' it would be 3 times PH (this statement is true for the example of a 4 point time to frequency transformation).

The factor μ of the clock drift obtained in the clock drift estimation means 15 is then forwarded to the clock drift compensation means 16, which performs a clock drift compensation on the complex output samples received from the time to frequency transformation means 12 according to the following formula:

$$B_i = e^{-\frac{2\pi}{N} \times i \times \mu} \times A_i \quad i = 1, 2, \ldots, N$$

whereby $A_i$ are the complex samples received from the time to frequency transformation means 12, $B_i$ are the complex outputs from the clock drift compensation means 16 to the equalizing means 17 and i is an integer between 1 and N, N being the combined length (number of samples) of one data block and one guard sequence in the data part of a received frame, wherein N also (normally) corresponds to the size of time to frequency transformation performed in the time to frequency transformation means 12 (for example, N=256 or any other suitable number).

It is to be noted that the first and the second guard sequence used in the correlation means 14 to obtain a correlation result can be any two suitable guard sequences of the same frame. In reference to FIG. 1, for example the first guard sequence could be the guard sequence g1 and the second guard sequence could be the guard sequence g2, so that the time distance between the first and the second guard sequence is a single data block plus one guard sequence. However, it could also be possible that the first and/or the second guard sequence is any other guard sequence, e.g. the guard sequence g3 or the guard sequence gL−1 or the guard sequence gL (L being an integer and characterizing the number of guard sequences within one data part of a frame). The time distance between the first and the second guard sequence is therefore an integer multiple of a length of a data block plus a guard sequence. Hereby, the time difference between the first and the second guard sequence which are chosen to be used for the correlation and the clock drift estimation can be set in a variable way, for example could depend on an actual clock difference between the transmitter clock and the receiver clock. For example, if the clock difference between the transmitter clock and the receiver clock is relatively high, the time difference between the first and the second guard sequence can be relatively small. However when the clock difference between the transmitter clock and the receiver clock is reduced, it is preferable that the time difference between the first and the second guard sequence is increased.

It is further to be noted that said correlation means 14 could further be adapted to perform at least one further correlation on at least one further guard sequence of said frame, and that said clock drift estimation means 15 could then be adapted to perform said clock drift estimation on the basis of averaged correlation results of the first, the second and the at least one further correlation. For example, a correlation and a clock drift estimation could be performed on any suitable pairs of guard sequences (e.g. the first and the second guard sequence and the first and third guard sequence, or the first and second guard sequence and the third and fourth guard sequence etc.) and the resulting clock drift estimates from each pair could then be averaged in any suitable way to obtain a final an accurate clock drift estimate. Hereby, the noise influence could be further reduced.

The advantage of the present invention is that the guard interval, and the guard sequence comprising the guard interval separating the data blocks of a data part is not only used as a cyclic prefix for the equalization, but also for a clock drift compensation, so that any additional overhead is reduced. Further, a better resolution and low complexity can be achieved by performing a clock drift compensation in the frequency domain. Although the present invention is particularly effective in wireless communication systems in which data are communicated with high rates, the present invention could also be successfully applied in low-rate communication systems.

The invention claimed is:

1. Receiving apparatus for receiving signals in a communication system, in which the signals are transmitted on the basis of frames, each frame comprising a data part comprising data blocks, wherein the data blocks are respectively separated by a guard sequence, said receiving apparatus comprising correlation means adapted to perform a correlation on the guard sequences of a received signal, clock drift estimation means adapted to perform a clock drift estimation in the frequency domain on the basis of the correlation result from the correlation means, and clock drift compensation means adapted to compensate the clock drift of the received signals on the basis of said clock drift estimation.

2. Receiving apparatus according to claim 1,
wherein said correlation means is adapted to perform a first correlation on a first guard sequence of a frame of a received signal and a second correlation on a second guard sequence of said frame, and wherein said clock drift estimation means is adapted to perform said clock drift estimation on the basis of correlation results of the first and the second correlation.

3. Receiving apparatus according to claim 2,
wherein said clock drift estimation means is adapted to perform said clock drift estimation on the basis of a phase difference between said first and said second correlation result.

4. Receiving apparatus according to claim 2,
wherein said clock drift estimation means is adapted to perform said clock drift estimation on the basis of only a part of said correlation result from said correlation means.

5. Receiving apparatus according to claim 2,
wherein said clock drift estimation means is adapted to perform said clock drift estimation on the basis of a highest peak of said correlation result(s).

6. Receiving apparatus according to claim 2,
wherein the time distance between the first and the second correlation performed by said clock drift estimation means is variable.

7. Receiving apparatus according to claim 2,
wherein said correlation means is adapted to perform at least one further correlation on at least one further guard sequence of said frame, and wherein said clock drift estimation means is adapted to perform said clock drift estimation on the basis of averaged correlation results of the first, the second and the at least one further correlation.

8. Receiving method for receiving signals in a communication system, in which the signals are transmitted on the basis of frames, each frame comprising a data part comprising data blocks, wherein the data blocks are respectively separated by a guard sequence, said receiving method comprising the steps of performing a correlation on the guard sequences of a received signal, performing a clock drift estimation in the frequency domain on the basis of the correlation result from the correlation step, and compensating the clock drift of the received signals on the basis of said clock drift estimation.

9. Receiving method according to claim 8,
wherein in said correlation step a first correlation on a first guard sequence of a frame of a received signal and a second correlation on a second guard sequence of said frame are performed, and wherein said clock drift estimation is performed on the basis of correlation results of the first and the second correlation.

10. Receiving method according to claim 9,
wherein said clock drift estimation is performed on the basis of a phase difference between said first and said second correlation result.

11. Receiving method according to claim 9,
wherein said clock drift estimation is performed on the basis of only a part of said correlation result from said correlation means.

12. Receiving method according to claim 9,
wherein said clock drift estimation is performed on the basis of a highest peak of said correlation result(s).

13. Receiving method according to claim 9,
wherein the time distance between the first and the second correlation performed in said clock drift estimation step is variable.

14. Receiving method according to claim 9,
wherein in said correlation step at least one further correlation on at least one further guard sequence of said frame is performed, and wherein said clock drift estimation is performed on the basis of averaged correlation results of the first, the second and the at least one further correlation.

* * * * *